(12) United States Patent
Miyazawa

(10) Patent No.: US 9,776,213 B2
(45) Date of Patent: Oct. 3, 2017

(54) SHEET MANUFACTURING APPARATUS

(71) Applicant: SEIKO EPSON CORPORATION, Tokyo (JP)

(72) Inventor: Kazuma Miyazawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 168 days.

(21) Appl. No.: 14/569,952

(22) Filed: Dec. 15, 2014

(65) Prior Publication Data
US 2015/0176204 A1 Jun. 25, 2015

(30) Foreign Application Priority Data

Dec. 25, 2013 (JP) ................................. 2013-266611
Feb. 25, 2014 (JP) ................................. 2014-033785

(51) Int. Cl.
*B07B 9/00* (2006.01)
*D21B 1/06* (2006.01)
*D21B 1/32* (2006.01)
*D21D 5/18* (2006.01)
*D21D 5/24* (2006.01)
*D21F 9/00* (2006.01)

(52) U.S. Cl.
CPC ................. *B07B 9/00* (2013.01); *D21B 1/06* (2013.01); *D21B 1/32* (2013.01); *D21D 5/18* (2013.01); *D21D 5/24* (2013.01); *D21F 9/00* (2013.01); *Y02W 30/646* (2015.05)

(58) Field of Classification Search
USPC ........................................................ 425/80.1
See application file for complete search history.

(56) References Cited

U.S. PATENT DOCUMENTS

| | | | | |
|---|---|---|---|---|
| 3,734,766 A | * | 5/1973 | Botz ....................... | A23K 1/146 428/376 |
| 4,440,635 A | * | 4/1984 | Reiniger ................. | B02C 18/08 209/306 |
| 4,562,969 A | * | 1/1986 | Lindahl .................... | D21D 5/02 162/55 |
| 5,324,389 A | * | 6/1994 | Spencer ................. | D21B 1/028 162/4 |
| 2014/0027075 A1 | | 1/2014 | Yamagami et al. | |

FOREIGN PATENT DOCUMENTS

JP 2012-144819 A 8/2012

* cited by examiner

*Primary Examiner* — Jacob Thomas Minskey
(74) *Attorney, Agent, or Firm* — Global IP Counselors, LLP

(57) ABSTRACT

A sheet manufacturing apparatus includes a classifier unit configured to classify by air flow an introduced material that has been introduced, a screening unit configured to allow a classified material, which comprises fibers, that has been classified by the classifier unit to pass through a plurality of openings to screen the classified material, and a forming unit configured to use a passed material that has passed through the openings to form a sheet. The classified material is supplied to the screening unit by the air flow.

12 Claims, 9 Drawing Sheets

SHEET MANUFACTURING APPARATUS

CROSS-REFERENCE TO RELATED APPLICATIONS

This application claims priority to Japanese Patent Application No. 2013-266611 filed on Dec. 25, 2013 and Japanese Patent Application No. 2014-033785 filed on Feb. 25, 2014. The entire disclosure of Japanese Patent Application Nos. 2013-266611 and 2014-033785 is hereby incorporated herein by reference.

BACKGROUND

Technical Field

The present invention relates to a sheet manufacturing apparatus.

Related Art

Conventionally known is a paper recycling apparatus having a dry-type defibrating unit for breaking up and defibrating paper, a first transferring unit for transferring a defibrated material that has been defibrated at the dry-type defibrating unit, a classifier unit for classifying by air flow and de-inking the defibrated material that has been transferred at the first transferring unit, a second transferring unit for transferring the defibrated material that has been de-inked at the classifier unit, and a paper forming unit for forming paper with the defibrated material that has been transferred at the second transferring unit. With this paper recycling apparatus, the classifier unit (a cyclone) and a forming drum of the paper forming unit are connected with a second transferring tube of the second transferring unit (for example, see Japanese laid-open patent publication No. 2012-144819).

When the defibrated material is being transferred from the cyclone to the forming drum in the paper recycling apparatus described above, however, a problem emerges in that a part of the second transferring tube connecting the cyclone and the forming drum has a horizontal portion and therefore the momentum of the air flow of the cyclone ends up gradually weakening in this horizontal portion, and the defibrated material ends up accumulating in the horizontal portion, thus stopping up supply of the defibrated material to the forming drum.

SUMMARY

Having been created in order to resolve the above-mentioned problems at least in part, the present invention can be implemented as the aspects and application examples described below.

A sheet manufacturing apparatus as in the present application example is characterized by comprising: a classifier unit configured to classify by air flow an introduced material that has been introduced; a screening unit configured to allow a classified material, which has fibers, that has been classified by the classifier unit to pass through a plurality of openings to screen the classified material; and a forming unit configured to form a sheet by using a passed material that has passed through the openings, the classified material being supplied to the screening unit by the air flow coming out from the classifier unit.

According to this configuration, the classifier unit classified the introduced material by air flow. Then, the classified material that has been classified is supplied to the screening unit by an air flow, of the aforesaid air flow, that leaves the classifier unit. This makes it possible to efficiently transfer the classified material, without any classified material accumulating midway in the screening unit from the classifier unit. The fibers included in the classified material also will not become entangled with one another, because there is no need to separately install an air-blowing machine such as a blower in the supply and transfer of the classified material from the classifier unit to the screening unit. Moreover, the apparatus configuration can be simplified.

A sheet manufacturing apparatus as in an application example described above is characterized in that the screening unit is configured to rotate and thereby cause the classified material to pass through the openings, and a direction of rotation of the classified material being supplied to the screening unit by the air flow inside the classifier unit and a direction of rotation of the screening unit are the same direction.

According to this configuration, the direction of rotation of the classified material by the classifier unit and the direction of rotation of the screening unit are the same, and therefore when the classified material is being fed into the screening unit from the classifier unit, the classified material can be merged in an unencumbered manner with the interior of the screening unit into which the classified material has already been fed.

A sheet manufacturing apparatus as in an application example described above is characterized in that the classifier unit is located above the screening unit, and the classifier unit and the screening unit are connected with a conduit that constantly goes downward.

According to this configuration, the classifier unit is located above the screening unit. In such a case, there is no need for the entirety of the classifier unit to be above the entirety of the screening unit, and it suffices for a part of the classifier unit to be above the entirety of the screening unit. The classifier unit and the screening unit are connected with a conduit that goes downward constantly, and therefore in addition to the air flow, the force of gravity is also applied to the classified material being transferred, making it easier to supply the classified material toward the screening unit. Therefore, it is possible to efficiently transfer the classified material, without any classified material accumulating midway in the screening unit from the classifier unit.

A sheet manufacturing apparatus as in an application example described above is characterized in that the classifier unit and the screening unit are directly connected without an intervening conduit.

According to this configuration, the classifier unit and the screening unit are directly connected, and therefore the air flow reliable acts on the classified material being transferred, and the classified material can be reliably supplied to the screening unit without any classified material stopping midway.

A sheet manufacturing apparatus as in an application example described above is characterized in that the classifier unit has a cylindrical or conical part, and an imaginary center line of the cylindrical or conical part is inclined with respect to a vertical direction.

According to this configuration, inclining the classifier unit with respect to the screening unit makes it easier to connect the two directly.

A sheet manufacturing apparatus as in an application example described above is characterized in that the screening unit is configured to rotate and thereby cause the classified material to pass through the openings, and a rotation center axis of the screening unit is along a horizontal direction.

According to this configuration, the rotation center axis of the screening unit is horizontal, and therefore deviation of the classified material in the screening unit can be prevented.

BRIEF DESCRIPTION OF THE DRAWINGS

Referring now to the attached drawings which form a part of this original disclosure.

DETAILED DESCRIPTION OF EXEMPLARY EMBODIMENTS

Embodiments of the present invention shall be described below, with reference to the accompanying drawings. In each of the drawings given below, the scale of the respective members and the like has been illustrated differently from the actual scale, in order to increase the size of the respective members and the like to such an extent as to be visually recognizable. The terms "above"/"below", "upper"/"lower", and "upward"/"downward" in the vertical direction are indicative of above, below, upper, and lower in a direction that runs along the vertical direction. Upward in the vertical direction is the direction opposite to the vertical direction. Instances where simply "above"/"below", "upper"/"lower", and "upward"/"downward" is stated are also indicative of "above"/"below", "upper"/"lower", and "upward"/"downward" in the vertical direction.

First, the configuration of a sheet manufacturing apparatus shall be described. The sheet manufacturing apparatus is based on a technology whereby a stock material (defibration object) Pu such as, for example, a pure pulp sheet or used paper is formed into a new sheet Pr. The sheet manufacturing apparatus has a classifier unit at which an introduced material that has been introduced is classified by air flow, a screening unit at which a classified material comprising fibers classified by the classifier unit is passed through a plurality of openings and screened, and a forming unit at which a passed material having passed through the openings is used to form a sheet; the classifier unit is located farther upward in the vertical direction than the screening unit, and the classified material is supplied to the screening unit by an air flow. The configuration of the sheet manufacturing apparatus shall be described in greater detail below.

Figure 1:
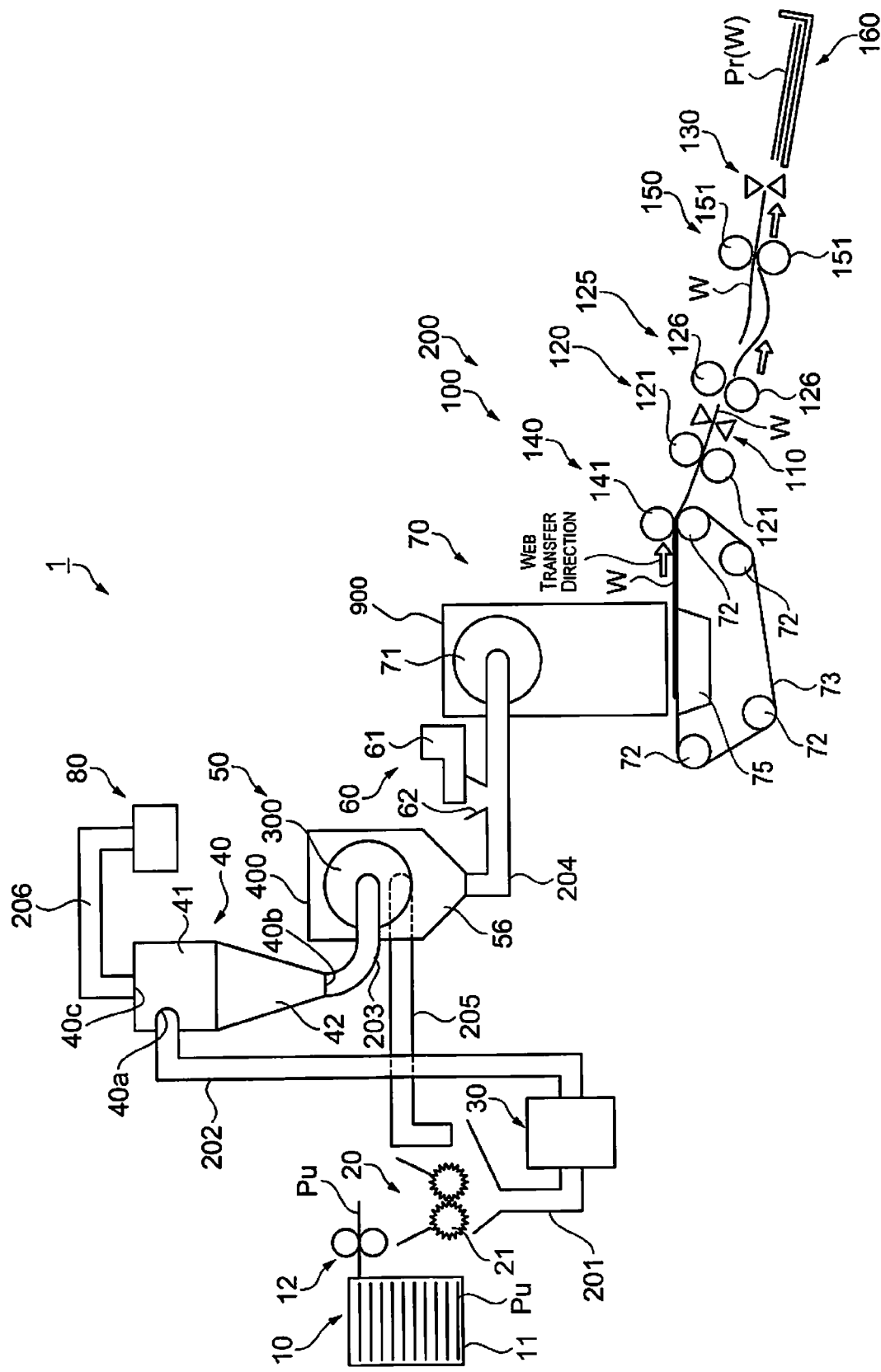
FIG. 1 is a schematic diagram illustrating the configuration of a sheet manufacturing apparatus.

FIG. 1 is a schematic diagram illustrating a configuration of a sheet manufacturing apparatus as in the present embodiment. As illustrated in FIG. 1, a sheet manufacturing apparatus 1 of the present embodiment is provided, inter alia, with a supplying unit 10, a crushing unit 20, a defibrating unit 30, a classifier unit 40, a screening unit 50, an additive agent feeding unit 60, a distribution unit 70, a transferring unit 100, a front cutting unit 110, and a forming unit 200. The sheet manufacturing apparatus 1 is also provided with a control unit for controlling these members.

The supplying unit 10 is for supplying the used paper Pu to the crushing unit 20. The supplying unit 10 is provided inter alia with, for example, a tray 11 on which a plurality of sheets of the used paper Pu are overlaid and accumulated, and an automatic feed mechanism 12 with which the used paper Pu in the tray 11 can be continuously fed to the crushing unit 20. Examples of the used paper Pu supplied to the sheet manufacturing apparatus 1 include A4-size paper, which is currently the norm in offices.

The crushing unit 20 is for cutting the used paper Pu thus supplied into pieces of paper that are several centimeters square. In the crushing unit 20, crushing blades 21 are provided, to constitute such an apparatus as to broaden the cutting width of blades in an ordinary shredder. This makes it possible to easily cut the used paper Pu thus supplied into pieces of paper. The crushed paper that has been divided is then supplied to the defibrating unit 30 via a tubing 201.

The defibrating unit 30 is provided with a rotary blade that rotates (not shown), and is for performing a defibration by which the crushed paper that is supplied from the crushing unit 20 is disentangled into fibers. The defibrating unit 30 of the present embodiment is one that performs the defibration dry in air. Printed ink or toner, anti-bleeding materials, or other coating materials on the paper or the like are turned into particles several tens of μm or smaller (hereinafter called "ink particles") and separated from the fibers by the defibration treatment of the defibrating unit 30. As such, the defibrated material that leaves the defibrating unit 30 is ink particles and fibers obtained by defibrating the pieces of paper. Then, there is a mechanism where an air flow is generated by the rotation of the rotating blade, and the fibers that have been defibrated ride this air flow and are transferred to the classifier unit 40 via a tubing 202. In a case where a dry-type defibrating unit 30 not provided with an wind generation mechanism is used, an air flow generation apparatus for generating an air flow toward the defibrating unit 30 from the crushing unit 20 should be separately provided.

The classifier unit 40 is one at which the introduced material that has been introduced is classified by air flow. In the present embodiment, the defibrated material, serving as the introduced material, is classified into the ink particles and the fibers. Applying, for example, a cyclone enables the classifier unit 40 to classify by air flow the fibers that have been transferred into the ink particles and de-inked fibers (de-inked defibrated material). Instead of the cyclone, however, another type of air flow-system classifier may be utilized. In such a case, for example, an elbow jet, eddy classifier, or the like is used as an air flow-system classifier other than the cyclone. An air flow-system classifier is for generating a swirling airflow, and separating and classifying by using differences in the centrifugal force received because of the size and density of the defibrated material, and allows for the classification points to be adjusted by adjusting the airflow speed and centrifugal force. The ink particles, which are smaller and less dense, and the fibers that are larger and denser than the ink particles are thereby divided. The act of removing the ink particles from the fibers is called de-inking.

The classifier unit 40 of the present embodiment is constituted of an introduction port 40a with introduction from the defibrating unit 30, a tube part 41 to which the introduction port 40a is attached in the tangential direction, a conical part 42 connected to a lower part of the tube part 41, a lower output port 40b provided to a lower part of the conical part 42, and an upper exhaust port 40c for discharging powder provided to the upper middle of the tube part 41. The radius of the conical part 42 decreases going downward the vertical direction.

In the classification process, the air flow bearing the defibrated material introduced from the introduction port 40a of the classifier unit 40 changes to circumferential movement in the tube part 41 and the conical part 42; this applies a centrifugal force and causes classification to take place. Then, being larger and denser than the ink particles, the fibers move toward the lower output port 40b whereas the smaller and less dense ink particles are guided to the upper exhaust port 40c as a fine powder along with air, and the de-inking proceeds. A short fiber mixture, which contains a large amount of ink particles, is discharged from the upper exhaust port 40c of the classifier unit 40. The discharged short fiber mixture containing a large amount of ink particles is collected at a receiving unit 80 via a tubing 206 connected to the upper exhaust port 40c of the classifier unit 40. A classified material comprising fibers that have been classified is transferred toward the screening unit 50 via a tubing 203 from the lower output port 40b of the classifier unit 40. A suction unit for efficiently suctioning the short fiber mixture from the upper exhaust port 40c, or the like, may be arranged at the upper exhaust port 40c of the classifier unit 40, the tubing 206, or elsewhere.

The screening unit 50 is one at which the classified material comprising fibers classified by the classifier unit 40 is passed through a plurality of openings 311 (see FIG. 2) and screened. More specifically, the screening unit 50 is one at which the classified material comprising fibers classified by the classifier unit 40 is screened into a passed material that passes through the openings 311 and a residual material that does not pass through the openings 311. The screening unit 50 of the present embodiment is provided with a mechanism for distributing the classified material in the air by a rotating motion. Then, the passed material that is passed through the openings 311 by the screening of the screening unit 50 is received at a hopper unit 56 and transferred to the distribution unit 70 via a tubing 204. The residual material that is not passed through the openings 311 by the screening of the screening unit 50, however, is again returned to the defibrating unit 30 as the defibration object, via a tubing 205 serving as a feed path. Thus, the residual material is not discarded but instead is reused (reutilized).

The passed material that is passed through the openings 311 by the screening of the screening unit 50 is transferred to the distribution unit 70 via the tubing 204. Provided between the screening unit 50 and the distribution unit 70 in the tubing 204 is an additive agent feeding unit 60 for adding an additive agent such as a resin (for example, a fusion-bondable resin or a heat-curable resin) to the passed material being conveyed. Examples of additives that can be fed in other than a fusion-bondable resin could also include flame retardants, whiteness enhancers, sheet strengtheners, sizing agents, or the like. These additives are retained in an additive agent retaining unit 61 and fed from a feed port 62 by a feeding mechanism (not shown).

The distribution unit 70 is one at which a web is formed using a material comprising a resin and the passed material comprising the fibers fed in from the tubing 204. The distribution unit 70 has a mechanism for uniformly distributing the fibers in the air and a mechanism for depositing the distributed fibers onto a mesh belt 73.

First, a forming drum 71 into the interior of which the fibers and resin are fed is arranged in the distribution unit 70, as a mechanism for uniformly distributing the fibers into the air. Then, rotatingly driving the forming drum 71 makes it possible to uniformly mix the resin (additive agent) into the passed material (fibers). A screen having a plurality of small holes is provided to the forming drum 71. The forming drum 71 can then be rotatingly driven to uniformly mix the resin (additive agent) into the passed material (fibers) and also uniformly distribute, into the air, the fibers or mixture of fibers and resin having passed through the small holes. The forming drum 71 is surrounded by a second housing unit 900. Scattering of the mixture is thereby curbed.

Disposed below the forming drum 71 is the endless mesh belt 73, on which is formed a mesh that is stretched by stretching rollers 72. Turning of at least one of the stretching rollers 72 causes the mesh belt 73 to move in one direction.

Provided to below the forming drum 71 in the vertical direction is a suction apparatus 75 serving as a suction unit for generating an air flow going downward in the vertical direction, through the mesh belt 73. The suction apparatus 75 makes it possible to suction the fibers distributed in the air onto the mesh belt 73.

The fibers and the like that pass through the small holes of the screen of the forming drum 71 are deposited onto the mesh belt 73 by the force of suction of the suction apparatus 75. At this time, moving the mesh belt 73 in one direction makes it possible to form a web W that comprises the fibers and the resin and has been deposited in an elongated shape. A continuous strip of the web W is formed by continuously distributing from the forming drum 71 and moving the mesh belt 73. The mesh belt 73 may be made of a metal, a resin, or a non-woven material, and may be of any material provided that the fibers can be deposited and the air flow can be passed therethrough. When the mesh of the mesh belt 73 has a hole diameter that is too large, then the fibers enter between the meshing and an unevenness occurs when the web (sheet) is formed, whereas when the mesh has too small a hole diameter, then it becomes difficult for the suction apparatus 75 to form a stable air flow. For this reason, preferably, the hole diameter of the mesh is adjusted as appropriate.

The suction apparatus 75 can be configured by forming an enclosed box that has an open window of a desired size below the mesh belt 73, and suctioning air from outside the window and giving the inside of the box a more negative pressure than the outside air. The "web W" as in the present embodiment refers to a constitution form of an object that comprises fibers and a resin. As such, an instance where there are changes in form such as changes in the dimensions at times such as during heating, compression, cutting, or transfer of the web W would still be indicated as being the web W.

The web W that is formed on the mesh belt 73 is transferred by the transferring unit 100. The transferring unit 100 of the present embodiment illustrates a process of transferring the web W up until ultimately being fed in to a stacker 160 as a sheet Pr (web W) from the mesh belt 73. As such, other than the mesh belt 73, a variety of rollers or the like also function as a part of the transferring unit 100. As the transferring unit, there should be at least one transferring belt or transferring roller. More specifically, first, the web W that has been formed on the mesh belt 73, which is a part of the transferring unit 100, is transferred in accordance with the direction of transfer (the arrow in the drawing) by the rotational movement of the mesh belt 73. In the present embodiment, the distribution unit 70 and the transferring unit 100 are included in the forming unit 200, which uses the web W to form the sheet Pr.

A pressurizing unit is arranged on the downstream side of the distribution unit 70 in the direction of transfer of the web W. The pressurizing unit of the present embodiment is a pressurizing unit 140 having a roller 141 for applying pressure to the web W.

Passing the web W through between the mesh belt 73 and the roller 141 makes it possible to apply pressure to the web W. This makes it possible to improve the strength of the web W.

Pre-cutting unit rollers 120 are arranged more on the downstream side than the pressurizing unit 140 in the direction of transfer of the web W. The pre-cutting unit rollers 120 are constituted of a pair of rollers 121. Of the pair of rollers 121, one is a drive control roller and the other is a driven roller.

A one-way clutch is used for a drive transmission unit for causing the pre-cutting unit rollers 120 to rotate. The one-way clutch has a clutch mechanism for transmitting a rotational force in only one direction, and is configured so as to idle in the opposite direction. Due thereto, when an excessive tension is applied to the web W by a speed difference between post-cutting unit rollers 125 and the pre-cutting unit rollers 120, there is idling on the pre-cutting unit roller 120 side and therefore the tension on the web W is kept in check and the web W can be prevented from being torn.

Arranged on the downstream side of the pre-cutting unit rollers 120 in the direction of the transfer of the web W is the front cutting unit 110, which cuts the web W in a direction intersecting with the direction of transfer of the web W being transferred. The front cutting unit 110 is provided with a cutter and cuts the continuous web W into leaflets (sheets) in accordance with a position of cutting, which is set to a predetermined length. Applicable examples for the front cutting unit 110 include a rotary cutter. According thereto, cutting can be performed while the web W is being transferred. As such, the transfer of the web W is not stopped during cutting, and therefore the manufacturing efficiency can be improved. A variety of cutters other than a rotary cutter may be applied as the front cutting unit 110.

The post-cutting unit rollers 125 are arranged on the downstream side in the direction of transfer of the web W from the front cutting unit 110. The post-cutting unit rollers 125 are constituted of a pair of rollers 126. Of the pair of rollers 126, one is a drive control roller and the other is a driven roller.

In the present embodiment, tension can be applied to the web W by a speed difference between the pre-cutting unit rollers 120 and the post-cutting unit rollers 125. The configuration is so as to drive the front cutting unit 110 and cut the web W in a state where a tension is applied to the web W.

A pair of heating and pressurizing rollers 151 constituting a heating and pressurizing unit 150 are arranged more on the downstream side than the post-cutting unit rollers 125 in the direction of transfer of the web W. The heating and pressurizing unit 150 is one at which the fibers included in the web W are bonded (fixed) to one another with a resin interposed therebetween. A heating member such as a heater is provided to a rotational axis center section of the heating and pressurizing rollers 151, and the web W being transferred is heated and compressed by passing of the web W through between the pair of heating and pressurizing rollers 151. The heating and compressing of the web W by the pair of heating and pressurizing rollers 151 makes it easier for the resin to melt and become entangled with the fibers, shortens the spacing between fibers, and increases the contact points between fibers. This raises the density and improves the strength of the resulting web W.

A rear cutting unit 130 for cutting the web W along the direction of transfer of the web W is arranged more on the downstream side than the heating and pressurizing unit 150 in the direction of transfer of the web W. The rear cutting unit 130 is provided with a cutter and cuts in accordance with a predetermined position of cutting in the direction of transfer of the web W. The sheet Pr (web W) of a desired size is thereby formed. The cut sheet Pr (web W) is then loaded onto the stacker 160, or the like.

The term "sheet" as in the embodiment described above refers to mainly to when sheets are made from a stock material comprising fibers, such as used paper or pure paper. However, there is no limitation thereto, and the sheet may be in the form of a board, or in the form of a web (or in a shape that is uneven). The stock material may also be cellulose or other plant fibers, polyethylene terephthalate (PET), polyester, or other chemical fibers, or wool, silk, or other animal fibers. In the present application, the "sheets" would be divided in paper and non-woven material. Paper encompasses forms made into thin sheets and the like, and encompasses recording paper intended for writing or printing, or wallpaper, wrapping paper, colored paper, Kent paper, and the like. Non-woven materials are thicker and have less strength than paper, and encompass non-woven materials, fiber board, tissue paper, kitchen paper, cleaners, filters, liquid-absorbing materials, sound-absorbing materials, mats, and the like.

In the present embodiment, "used paper" refers primarily to paper that has been printed on, but any stock material that is formed as paper is regarded as being used paper, irrespective of whether the stock material has been used or not.

Figure 2:
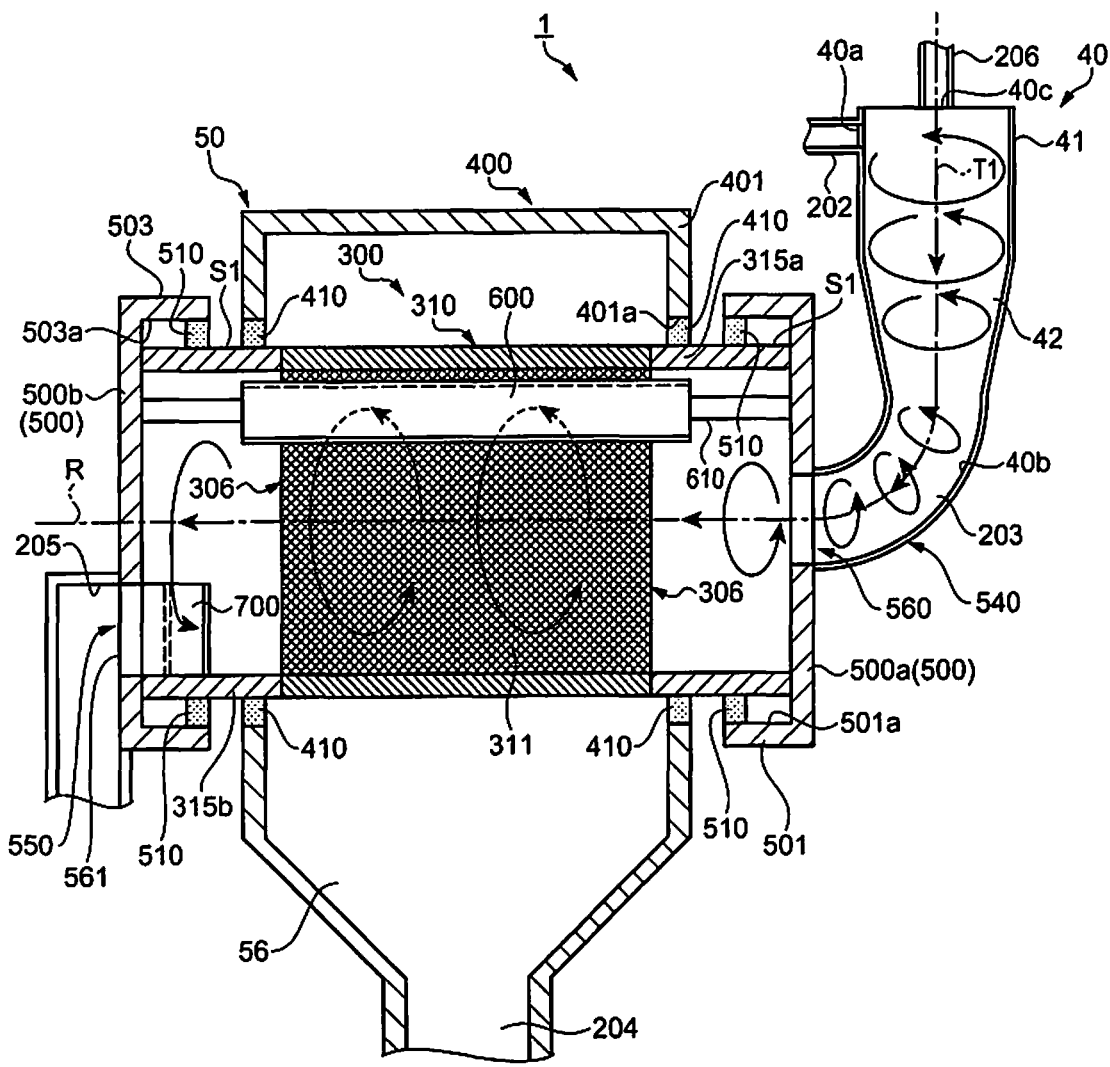
FIG. 2 is a detail diagram illustrating the configuration of a classifier unit and a screening unit.
Figure 3:
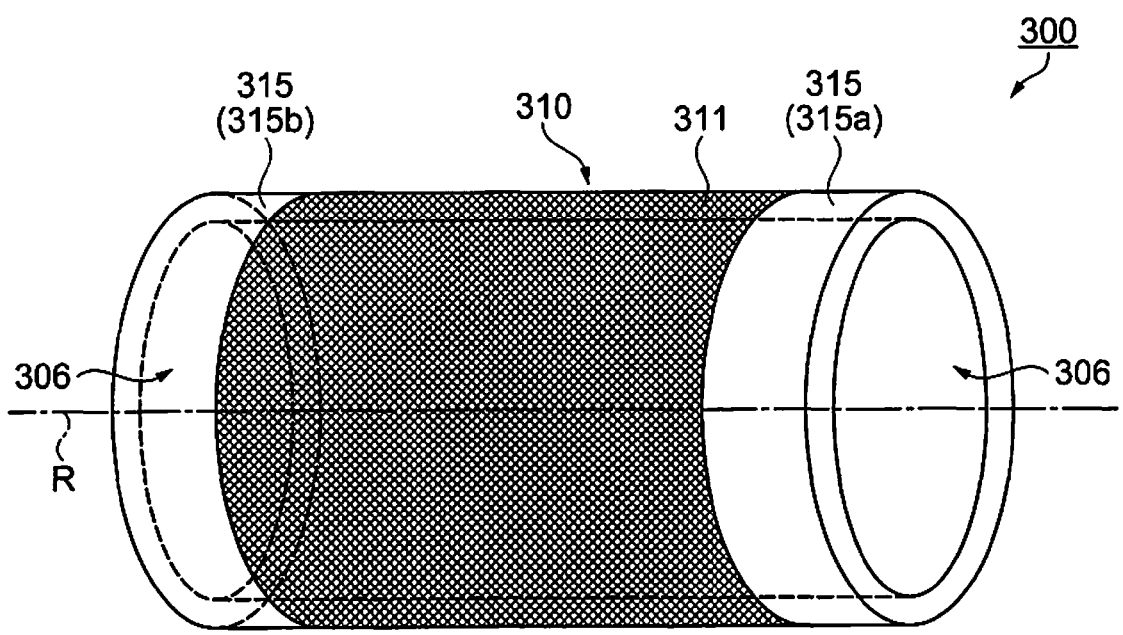
FIG. 3 is a schematic diagram illustrating the configuration of a drum unit.
Figure 4:
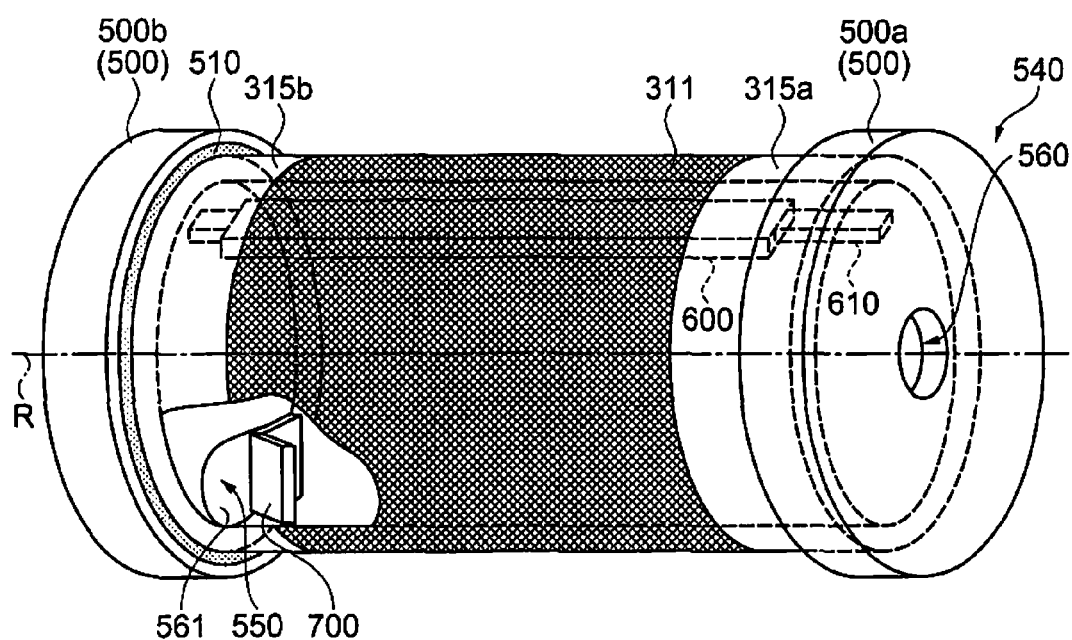
FIG. 4 is a schematic diagram illustrating the configuration of a screening unit.
Figure 5:
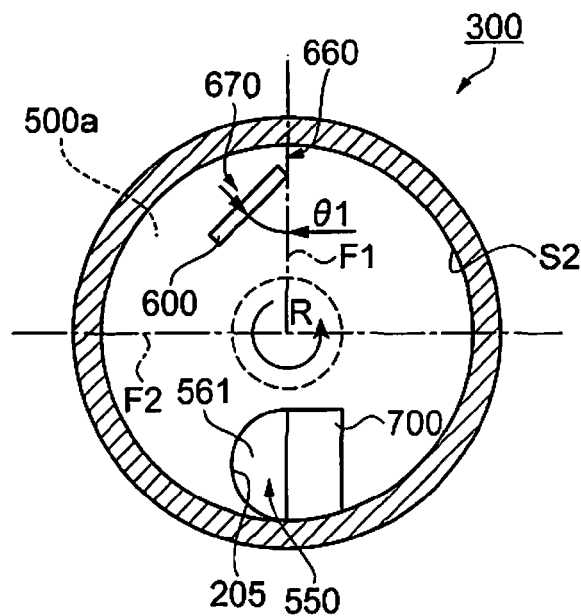
FIG. 5 is a schematic diagram illustrating the configuration of the screening unit.
Figure 6:
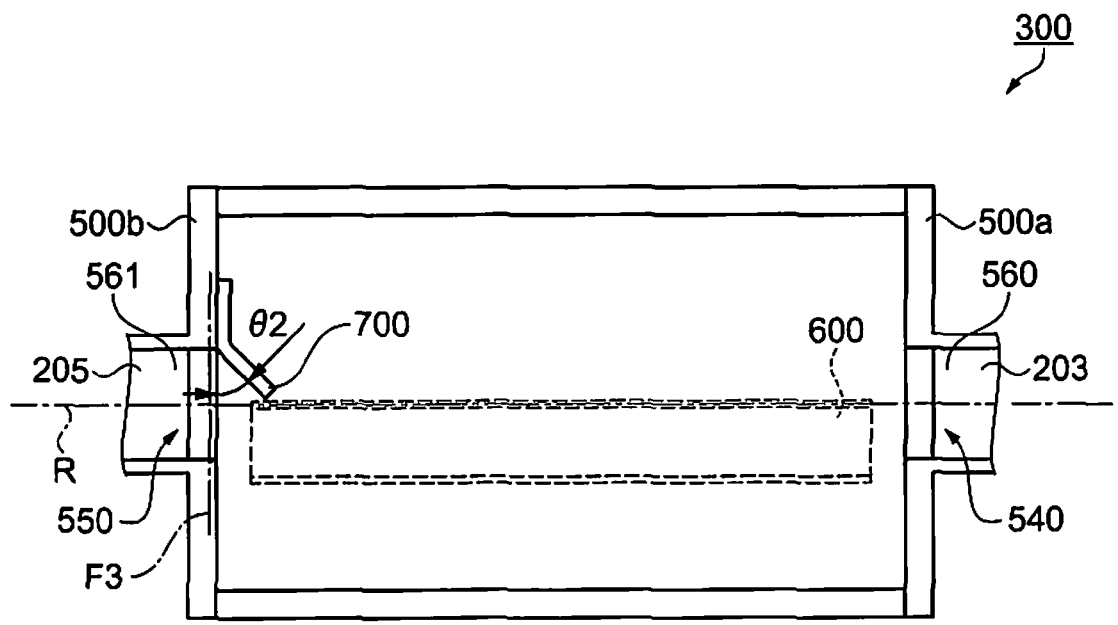
FIG. 6 is a schematic diagram illustrating the configuration of the screening unit.

Next, the configurations of the classifier unit and the screening unit shall be described in greater detail. FIG. 2 is a detail diagram illustrating the configurations of the classifier unit and the screening unit, FIG. 3 is a schematic diagram illustrating the configuration of a drum unit, and FIGS. 4 to 6 are schematic diagrams illustrating the configuration of the screening unit. FIG. 6 is a view where the screening unit in FIG. 2 is viewed from above in FIG. 2.

The configuration is such that the classifier unit 40 is located above the screening unit 50 in the vertical direction, and the classified material is supplied to the screening unit 50 by the air flow. In the present embodiment, as illustrated in FIG. 2, a part of the classifier unit 40 is located above the entirety of the screening unit 50. More specifically, the position of a lowermost part of the conical part 42 of the classifier unit 40 is located above a material supply port 560 of the screening unit 50. In this manner, the action of the air flow and the force of gravity makes it possible for the classified material to be efficiently transferred toward the screening unit 50, which is arranged downward from the classifier unit 40, which is arranged upward. Also, in the present embodiment, the classifier unit 40 and the screening unit 50 are connected at the tubing 203 serving as a conduit constantly going downward in the vertical direction. The tubing 203 is a curved conduit. This makes it possible for a direction of transfer T1 in the classifier unit 40 and a direction of supply for the screening unit 50 to be different and yet linked together. Because the tubing 203 is always oriented downward in the vertical direction, the classified material will not accumulate in the tubing 203 but rather will be transferred in an unencumbered manner from the classifier unit 40 to the screening unit 50. The tubing 203 need not be curved, however, and may instead be a rectilinear path that is oriented downward constantly.

Herein, the configuration of the screening unit 50 shall be described in greater detail. As illustrated in FIG. 2, the screening unit 50 is provided with a drum unit 300 serving as a cylindrical unit, as well as a first housing unit 400, inter alia.

In the drum unit 300, as illustrated in FIG. 3, there are an opening unit 310 where there are a plurality of openings 311 at which a material comprising at least fibers passes through in air, and a tubular unit 315 where there are no openings 311. The opening unit 310 and the tubular unit 315 are fastened by welding, a screw, or the like, and rotate integrally. The drum unit 300 is formed in a cylindrical shape using a metal plate of stainless steel or the like having a uniform thickness, and release ports 306 are provided to both ends thereof.

The plurality of openings 311 (perforated metal) are provided to the opening unit 310. The configuration is such that a material comprising fibers that is distributed from the openings 311 passes through, and the size, region of formation, and the like of the openings is set as appropriate depending on the size, type, and so forth of the material comprising fibers. The opening unit 310 is not limited to being perforated metal, and may be a wire mesh material or the like. The plurality of openings 311 have the same size (surface area), and each is arranged at equal intervals. This causes the material that has passed through the openings 311 to be deposited on the mesh belt 73 at a uniform thickness and density. Also, when passing through the openings 311, the intertwined fibers are untangled. The tubular unit 315 is a portion where there are no openings 311 or the like, and is a portion that is in contact with the first housing unit 400.

The first housing unit 400, as illustrated in FIG. 2, has a frame body 401, and the drum unit 300 is partially enclosed by the first housing unit 400 so that the opening unit 310 of the drum unit 300 comes to the inside of the frame body 401. In other words, the opening unit 310 of the drum unit 300 is located in a space inside the first housing unit 400. The first housing unit 400 and the tubular unit 315 are in contact with one another. In the present embodiment, as illustrated in FIG. 3, the drum unit 300 has a tubular unit 315a, the opening unit 310, and a tubular unit 315b along a direction of extension of a rotational center axis R. As illustrated in FIG. 2, the first housing unit 400 is in contact with a surface (cylindrical surface) S1 in the tubular units 315a, 315b that is away from the rotational center axis R. This results in contact between the first housing unit 400 and the tubular units 315a, 315b, making it possible to prevent the material comprising fibers and the like that has passed through from the openings 311 from diffusing outwardly from the interior of the first housing unit 400. The first housing unit 400 is arranged on the inside of the drum unit 300 in a rotation axis direction R of the drum unit 300, and therefore it becomes possible to obtain a configuration where the width dimension of the first housing unit 400 is shorter than the width dimension of the drum unit 300 in the rotation axis direction R of the drum unit 300, and the apparatus configuration can be reduced in size. Below the first housing unit 400, the hopper unit 56 is provided. In the present embodiment, rotation of the drum unit 300 of the screening unit 50 causes the classified material to pass through the openings 311. Also, the rotational center axis R of the drum unit 300 is in the horizontal direction.

The direction of rotation of the classified material supplied to the screening unit 50 by the air flow inside the classifier unit 40 and the direction of rotation of the screening unit 50 are the same. More specifically, as illustrated in FIG. 2, the classified material is transferred in the direction of transfer T1 of the classified material being transferred from the classifier unit 40 to inside the screening unit 50, while rotating exclusively in the same direction. That is to say, the configuration is such that the direction of generation of the air flow in the classifier unit 40 and the direction of rotation of the drum unit 300 of the screening unit 50 are the same.

The first housing unit 400 has a first pile seal unit 410, and the surfaces S1 of the tubular unit 315 and the first pile seal unit 410 are in contact. The first pile seal unit 410 is one that is constituted of, for example, a base unit and a plurality of fibers that are densely planted on one side of the base unit. In the pile seal unit, the plurality of fibers are planted densely enough that the fibers that have passed through from the openings 311 of the drum unit 300 are unable to pass therethrough. The configuration is also such that the other side of the base unit of the first pile seal unit 410 and a frame body bonding surface 401a of the first housing unit 400 are bonded together, and distal ends of the fibers of the first pile seal unit 410 are in contact with the surface S1 of the tubular unit 315. There is no opening on the surface S1 of the tubular unit 315 with which the first pile seal unit 410 is in contact. Also, preferably, at least the surface S1 with which the first pile seal unit 410 is in contact is free of unevenness. This causes a gap between the frame body 401 of the first housing unit 400 and the tubular unit 315 of the drum unit 300 to be substantially blocked off by the first pile seal unit 410. As such, it is possible to accumulate the material comprising fibers that has passed through from the openings 311 of the drum unit 300 and the like in the interior of the first housing unit 400, thus preventing discharging thereof to the outside of the first housing unit 400. Also, when the drum unit 300 rotates about the rotational center axis R, wear at a portion of sliding between the tubular unit 315 and the first pile seal unit 410 is prevented, and the rotational load on the drum unit 300 can be reduced. The length of the fibers of the first pile seal unit 410 is set so as to be longer than the gap between the frame body 401 of the first housing unit 400 and the tubular unit 315 of the drum unit 300. This is in order for the first pile seal unit 410 to be reliably contacted with the tubular unit 315.

In the screening unit 50 of the present embodiment, as illustrated in FIGS. 2 and 4, there are two side units 500 (500a, 500b) that do not rotate at both ends of the drum unit 300 in the direction of extension of the rotational center axis R. Also, the screening unit 50 of the present embodiment is provided with: an introduction unit 540 that is provided to one side unit 500a and introduces the material to the drum unit 300; and a discharge unit 550 that is provided to the other side unit 500b, is located below the introduction unit 540 in the vertical direction, and discharges the residual material, which is material that has not passed through the openings 311. The drum unit 300 is rotatably supported by a support unit (not shown).

The side units 500a, 500b have fixed flange units 501, 503 on the outside of the tubular units 315a, 315b, and the tubular unit 315 and the flange units 501, 503 are in contact via a second pile seal unit 510. The side units 500a, 500b are fixed to an external frame (not shown). Provided to the side unit 500a is a material supply port 560 that constitutes a part of the introduction unit 540 for introducing the material comprising fibers to the drum unit 300 interior. Provided to the side unit 500b is a material discharge port 561 that constitutes a part of the discharge unit 550 for discharging the residual material, which is material that has not passed through the openings 311. The position of arrangement of the material supply port 560 is arranged at the same middle part as the rotational center axis R or spaced more upward in the vertical direction than the rotational center axis R. In the present embodiment, as illustrated in FIG. 4, the position of arrangement of the material supply port is the same position as the rotational center axis R, i.e., the center of the material supply port 560 is the same position as the rotational center axis R. Because the material inside the drum unit 300 of the screening unit 50 collects below, arranging the material supply port 560 at the same position as the rotational center axis R causes the material to be supplied from substantially midway on the side unit 500a of the drum unit 300. That is to say, because the material is supplied in a space where the material is not accumulated (has low density), collisions between the material are reduced and the material can be supplied in an unencumbered manner.

The second pile seal unit 510 is one that is constituted of, for example, a base unit and fibers that are densely planted on one side of the base unit. Also, the present embodiment is configured so that the other side of the base unit of the second pile seal unit 510 and surfaces 501a, 503a of the flange units 501, 503 are bonded together, and the distal ends of the fibers of the second pile seal unit 510 are in contact with the surface S1 of the tubular unit 315. This causes a gap between the flange units 501, 503 and the tubular unit 315 of the drum unit 300 to be substantially blocked off by the second pile seal unit 510. As such, the material comprising fibers in the drum unit 300 and the like can be prevented from being discharged from the gap between the tubular unit 315 of the drum unit 300 and the flange units 501, 503. Also, because the drum unit 300 rotates about the rotation center axis R with respect to the side units 500, using the second pile seal unit 510 for the portion of sliding between the side units 500 and the tubular unit 315 prevents the generation of friction between the side units 500 and the tubular unit 315 and makes it possible to reduce the rotational load on the drum unit 300. The length of the fibers of the second pile seal unit 510 is set so as to be longer than the gap between the flange units 501, 503 and the tubular unit 315 of the drum unit 300. This is in order for the second pile seal unit 510 to be reliably contacted with the tubular unit 315.

In the screening unit, as illustrated in FIGS. 2 and 4 to 6, a fixing member 600 is fixedly arranged inside the drum unit 300. The fixing member 600, as illustrated in FIG. 5, is fixedly arranged spaced more upward in the vertical direction than the rotation center axis R inside the drum unit 300. The fixing member 600 is a member in contact with the material that moves along with the rotating drum unit 300. In the direction of extension of the rotation center axis R, the fixing member 600 is larger than the opening unit 310 and smaller than the drum unit 300. Therefore, the fixing member 600 is in contact with at least the material that moves along with the opening unit 310.

As illustrated in FIG. 5, the fixing member 600 is fixed to the two side units 500a, 500b. In the present embodiment, in a state where a gap (space) 660 is provided between the fixing member 600 and a reverse surface S2 of the tubular unit 315, the fixing member 600 and each of the side units 500a, 500b are connected and fixed with a fixture 610. In other words, the fixing member 600 is arranged spaced apart from the drum unit 300. Due thereto, though the drum unit 300 rotates, the fixing member 600 and the side units 500a, 500b are fixed so as not to rotate. The fixture 610 extends in the longitudinal direction of the fixing member 600 from the fixing member 600 and is connected to each of the side units 500a, 500b. That is to say, in the vicinity of the rotation center axis R of the drum unit 300 beneath the fixing member 600 in the vertical direction, there is no fixture 610 or the like arranged, and the material that is in contact with the fixing member 600 falls downward without coming into contact with an obstacle or the like. The fixture 610 is smaller than the fixing member 600, and does not come into contact with the material that moves along with the rotating drum unit 300.

The portion of the fixing member 600 that comes into contact with the material is planar in shape. In the present embodiment, this portion is a plate-shaped member that has a square cross-section. This causes a rotating material to be efficiently in contact with the fixing member 600. Also, because the fixing member 600 has an easy shape, it is possible to reduce the manufacturing steps, the installation steps, and the like. The portion of the fixing member 600 that is in contact with the material may be flat surface or a curved surface, provided that the portion be planar. Planar here refers to the state where a surface lacks any convexities or concavities. When there are convexities or concavities, the material ends up becoming stuck. Should sticking be prevented by tapering or curving the end parts of convexities or concavities, this would be regarded as planar.

As illustrated in FIG. 5, the fixing member 600 is inclined with respect to an imaginary vertical plane F1 that passes through the rotation center axis. In the present embodiment, an angle θ1 of installation of the fixing member 600 with respect to the imaginary vertical plane F1 is set to about 40° to 50°, but can be set as appropriate depending on the magnitude of the volume of the drum unit 300, the rotational speed, the volume of material fed to the drum unit 300, and the like.

Also, in the fixing member 600 of the present embodiment, it is arranged downstream from the imaginary vertical plane F1 in the direction of rotation, which is more upward in the vertical direction inside the drum unit 300 than an imaginary horizontal plane F2 passing through the rotation center axis R. This makes it possible to further increase the distance at which the material, clinging to an inner wall of the drum unit 300 above the drum unit 300, comes unstuck and falls downward.

This makes it possible to increase the efficiency of a sieving function.

Furthermore, as illustrated in FIGS. 2 and 4 to 6, the screening unit 50 has a guiding unit 700 for guiding the residual material to the discharge unit 550, inside the drum unit 300. This guiding unit 700 is located on the lower side in the vertical direction from the rotation center axis R, on the discharge unit 500 side in the direction of extension of the rotation center axis R, as illustrated in FIGS. 2 and 5. Also, when the one side unit 500a is viewed in the direction of extension of the rotation center axis R, as illustrated in FIG. 5, the guiding unit 700 is located on the downstream side in the direction of rotation of the drum unit 300 with respect to the discharge unit 550. This makes it possible to easily cause the residual material inside the drum unit 300 to be guided to the material discharge port 561 side of the discharge unit 550.

The guiding unit 700 of the present embodiment is formed of a plate-shaped member that has a square cross-section. The guiding unit 700 is provided to the other side unit 500b. This produces such a configuration that the drum unit 300 rotates and yet the guiding unit 700 and the side units 500a, 500b do not rotate.

Also, as illustrated in FIG. 6, the guiding unit 700 is inclined in the direction in which the residual material moving in association with the rotation of the drum unit 300 comes up against the guiding unit 700 and moves to the discharge unit 550 side. In the present embodiment, an angle θ2 of installation of the guiding unit 700 with respect to an imaginary vertical plane F3 that is perpendicular to the rotation center axis is set to about 60° to 70°, but can be set as appropriate depending on the magnitude of the volume of the drum unit 300, the rotational speed, the volume of material fed to the drum unit 300, and the like.

A lowermost part in the vertical direction in the inside of the discharge unit 550 is set so as to be, in the vertical direction, the same height as or lower than a lowermost part in the vertical direction in the inside of the drum unit 300. In the present embodiment, as illustrated in FIGS. 2 and 5, a lowermost part in the vertical direction in the material discharge port 561 of the discharge unit 550 and the lowermost part in the vertical direction in the inside of the drum unit 300 are the same height in the vertical direction. A lowermost part of the guiding unit 700 in the vertical direction is the same height in the vertical direction as the lowermost part in the vertical direction in the inside of the drum unit 300. In this manner, the drum unit 300 and the material discharge port 561 (discharge unit 550) are flattened at the lowermost parts in the vertical direction, and therefore the residual material is transferred in an unencumbered manner from the drum unit 300 toward the tubing 205, without becoming stuck between the drum unit 300 and the material discharge port 561 (discharge unit 550). The tubing 205 extends downward in the vertical direction, and the force of gravity causes there to be downward transferring.

Figure 7A:
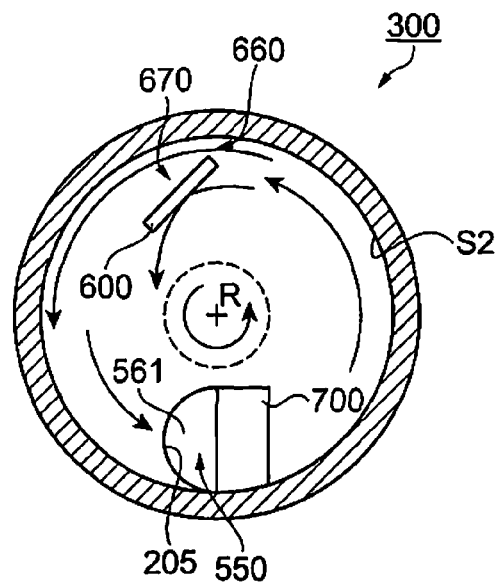
FIGS. 7A and 7B are descriptive diagrams illustrating a method of operation of a sheet manufacturing apparatus.
Figure 7B:
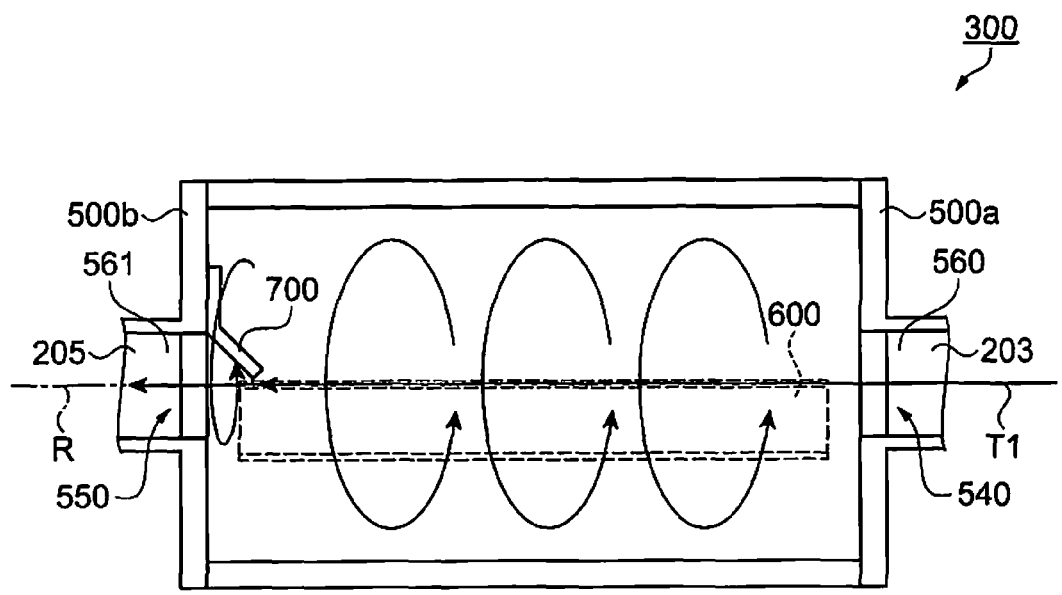

Next, a method of operation of the sheet manufacturing apparatus 1 shall be described with reference to FIGS. 2, 7A and 7B. FIGS. 7A and 7B are descriptive diagrams illustrating a method of operation of a sheet manufacturing apparatus.

First, the defibrated material having been defibrated by the defibrating unit 30 is introduced riding on the air flow from the introduction port 40a of the classifier unit 40 via the tubing 202. The motion of the defibrated material introduced to the classifier unit 40 changes to circumferential movement in the tube part 41, and there is classification by using differences in the centrifugal force received because of the size and density of the defibrated material. The classified material thus classified moves to the conical part 42 side due to the centrifugal force and the force of gravity, while also maintaining circumferential movement in a constant direction with respect to the direction of transfer T1. The material is then transferred to the screening unit 50 via the tubing 203 from the lower output port 40b of the lower part of the conical part 42. At this time, the classified material is transferred to the screening unit 50 riding a residual air flow coming out from the lower output port 40b out of the air flow that was introduced from the introduction port 40a. The air flow coming out from the lower output port 40b also maintains a circumferential movement.

Herein, the screening unit 50 is positioned below with respect to the classifier unit 40 and the classifier unit 40 and the screening unit 50 are connected together with the tubing 203 constantly going downward in the vertical direction, and therefore the classified material is transferred from the classifier unit 40 to the screening unit 50 in an unencumbered manner due to the force of gravity, as well.

At the screening unit 50, the classified material is introduced to inside the screening unit 50 from the material supply port 560 of the introduction unit 540 in a state where the drum unit 300 is rotating in the same direction of rotation as the direction of rotation of the classified material in the classifier unit 40, the center of which is the rotation center axis R. The centrifugal force from the rotation of the drum unit 300 causes the classified material to pass through the openings 311, and what passes through is transferred to the tubing 204 from the hopper unit 56 as the passed material. The passed material in this case is primarily fibers shorter than the size of the mesh opening of the openings 311. What does not pass through the openings 311, in turn, is discharged from the discharge unit 550 without having been passed through the openings 311, as the residual material. The residual material in this case is fibers too long to pass through the openings 311, undefibrated pieces that were not fully defibrated, lumps of entangled fibers, and the like.

Herein, the classified material (material comprising fibers) introduced to the screening unit 50 moves in the same direction of rotation as the rotation of the drum unit 300, but some of the classified material comes into contact (collides) with the fixing member 600, which is arranged spaced apart more upward in the vertical direction than the rotation center axis R of the drum unit 300, as illustrated in FIG. 7A, and the contacted classified material drops downward from the fixing member 600. This causes the material clinging to the inner wall of the opening unit 310 to come unstuck from the inner wall of the opening unit 310 and again move rotatingly. Because the fixing member 600 and the drum unit 300 are spaced apart from one another, some of the material flows into the gap 660 between the inner wall of the opening unit 310 and the fixing member 600. At this time, regarding the material that passes through the gap 660, the material clinging to the inner wall of the opening unit 310 is pulled off away from the reverse surface S2 of the drum unit 300 due to the negative pressure in the space 670 formed between the inner wall of the opening unit 310 and the fixing member 600, and therefore moves rotatingly through the inside of the opening unit 310 once again. With the impact of colliding with the fixing member or falling downward, the entangled fibers are distributed and untangled. The untangled fibers now more readily pass through the opening unit 310, from which the material that was clinging has been peeled off. Moreover, the material that was clinging to the inner wall of the opening unit 310 more readily changes position due to having been peeled away. The material repeating a rotational movement moves to the discharge unit 550 side. Of the material, what passes through the openings 311 flows into the hopper unit 56 as the passed material. In turn, what repeats the rotational movement and yet does not pass through the openings 311 moves rotatingly to the discharge unit 550 side as the residual material.

The residual material, having moved rotatingly to the discharge unit 550 side, collides with the guiding unit 700 arranged at a position of the side unit 500b corresponding to the tubing 205, as illustrated in FIG. 7B, and is guided to the tubing 205 side due to the inclining of the guiding unit 700 in the direction of movement to the discharge unit 550 side. This causes the residual material inside the drum unit 300 to be efficiently discharged out. The residual material discharged from the discharge unit 550 is transferred to the defibrating unit 30 via the tubing 205 (see FIG. 1).

The following effects can be obtained according to the embodiment as described above.

The classifier unit 40 is located above the screening unit 50 in the vertical direction. Because the classifier unit 40 is located above the screening unit 50 in the vertical direction, the classified material classified by the classifier unit 40 is more readily supplied to the screening unit 50 due to the air flow, on the downward side. The classified material moves in the direction of gravity. This makes it possible to efficiently transfer the classified material, without any classified material accumulating midway in the screening unit 50 from the classifier unit 40. Moreover, because the direction of rotation of the classified material due to the classifier unit 40 and the direction of rotation of the screening unit 50 are the same, the classified material, when fed into the screening unit 50 from the classifier unit 40, can be smoothly merged in the interior of the screening unit 50 to which the classified material has already been fed.

The present invention is not limited to the embodiment described above, but rather a variety of modifications, improvements, or the like could be made to the embodiment described above. Modification examples shall be described below.

Modification Example 1

Figure 8:
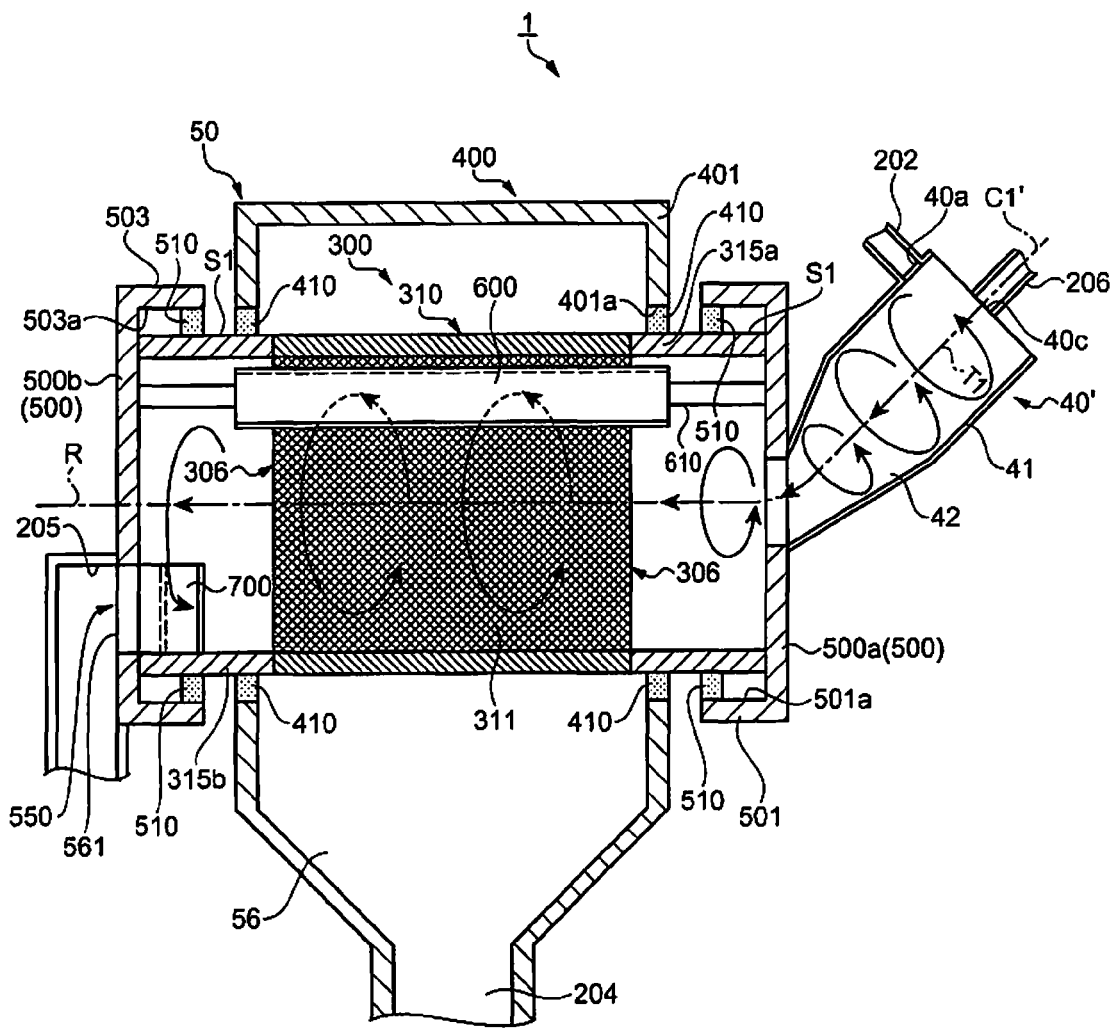
FIG. 8 is a detail diagram illustrating the configuration of a classifier unit and a screening unit as in a modification example.

In the embodiment above, the classifier unit 40 and the screening unit 50 were connected with the tubing 203, but there is no limitation to this configuration. For example, the configuration may be one where the classifier unit 40 and the screening unit 50 are directly connected without any intervening conduit or the like. FIG. 8 is a detail diagram illustrating a classifier unit and screening unit as in a modification example. As illustrated in FIG. 8, a classifier unit 40' and a screening unit 50' are directly connected. So doing reduces the places where the classified material collects between the classifier unit 40' and the screening unit 50', and therefore makes it possible for the classified material to be reliably transferred from the classifier unit 40' to the screening unit 50'. Moreover, the classifier unit 40' has a cylindrical or conical part, and an imaginary center line C1' of the cylindrical or conical part is inclined with respect to the vertical direction. So doing makes it easy to directly connect the classifier unit 40' and the screening unit 50' together. The other portions are similar to the configuration of the embodiment above and therefore a description has been omitted.

Modification Example 2

Figure 9:
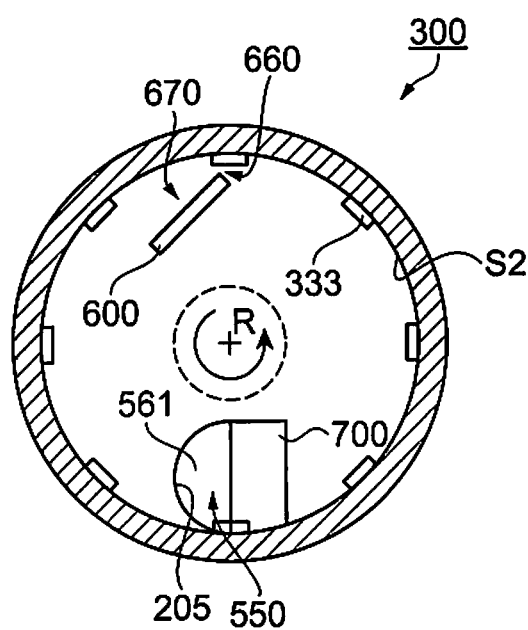
FIG. 9 is a schematic unit illustrating the configuration of a classifier unit as in a modification example.

In the embodiment above, the inner peripheral surface of the opening unit 310 of the drum unit 300 was a smooth surface, but there is no limitation to this configuration. For example, there may be irregularities on the inner peripheral surface of the opening unit 310. FIG. 9 is a schematic unit illustrating the configuration of a classifier unit as in a modification example. As illustrated in FIG. 9, convexities 333 are formed on the inner peripheral surface of the opening unit 310, and this forms irregularities on the inner peripheral surface. The shape of the convexities 333 may be a shape that extends along the direction of extension of the rotation center axis R of the drum unit 300, or may be dots. So doing allows the material to move more easily along with the drum unit 300, due to the irregularities, and makes it possible to improve the sieving function.

Modification Example 3

The rotation center axis of the drum unit 300 was the horizontal direction in the embodiment above, but is not limited thereto. For example, the configuration may be one where the rotation center axis R of the drum unit 300 is inclined with respect to the horizontal plane. In such a case, the rotation center axis R of the drum unit 300 is inclined with respect to the horizontal plane so that the discharge unit 550 side is lower than the introduction unit 540 side. So doing makes it possible to improve the ability to discharge the residual material, because the residual material inside the drum unit 300 moves to the discharge unit 550 side due to the force of gravity.

Modification Example 4

The fixing member 600 was employed for the drum unit 300 of the screening unit 50 in the embodiment above, but is not limited thereto. The fixing member 600 may be employed for the forming drum 71 of the distribution unit 70. The small holes of the forming drum 71 also allow the material comprising fibers to pass through, and therefore can be regarded as a form of screening unit. In such a case, the small holes of the forming drum function similarly to the openings 311. Herein, the small holes of the forming drum 71 have the same size as or larger than that of the openings 311. This makes it possible for the material that has passed through the openings 311 to also pass through the small holes of the forming drum 71. Therefore, because there is no passed material that cannot pass through the small holes of the forming drum 71, there forming drum 71 no longer has the guiding unit 700.

Modification Example 5

The embodiment above does not depict a drive unit for rotating the drum unit 300.

For the drive unit, for example, a gear is provided to the tubular unit 315, which is located on the outside (outside from a portion in contact with the first pile seal unit 410) of the first housing unit 400 in FIG. 2, and driving is performed by a belt or gear. This manner of having the drive unit be located at the outside of the first housing unit 400 makes it possible to prevent the material comprising fibers from becoming caught in the drive unit, which would cause driving to be defect or would increase the driving load.

Modification Example 6

In the embodiment above, the opening unit 310 and the tubular unit 315 are depicted such that the outer surface and inner surface are flush, but there may be a stepped difference.

Modification Example 7

In the embodiment above, terms such as "same", "uniform", "equal intervals", "circle", and the like encompass error, cumulative error, and the like, and need not necessarily be entirely the same, uniform, equal intervals, true circles, or the like.

Modification Example 8

In the embodiment above, in the direction of extension of the rotation center axis R, the fixing member 600 is larger than the opening unit 310 and smaller than the drum unit 300. There is no limitation thereto, and the fixing member 600 may be the same size as the drum unit 300. At such a time, there need not be a fixture 610, and the fixing member 600 may be fixed to the side units 500*a*, 500*b*. The fixture 610 was provided to both sides of the fixing member 600, but may instead be provided to only one side. In particular, on the discharge unit 550 side, the residual material is discharged with the guiding unit 700, and therefore it is better for the material not to be peeled away with the fixing member 600. Therefore, either the fixture 610 may be provided only on the discharge unit 550 side, or a notch may be provided to the fixing member 600 to prevent contact with the material.

Modification Example 9

In the embodiment above, the material supply port 560 was provided at either the same middle part as the rotation center axis R in the side unit 500a, or spaced apart upward in the vertical direction from the rotation center axis R. There is no limitation thereto, and the material supply port 560 may be at a position that is moved (spaced apart) in the horizontal direction from the middle part. In such a case, it is better for the position to be moved in the horizontal direction from the rotation center axis R toward the side opposite to the fixing member 600. This prevents any interference between the material that is supplied from the material supply port 560 and the material that has come into contact with the fixing member 600 and fallen, and makes it possible for the material to be quickly supplied from the material supply port 560.

Modification Example 10

The embodiment above was depicted such that in the fixing member 600, the upward end part and downward end part in the vertical direction are parallel to the rotation center axis R. However, provided that the downward end part of the fixing member 600 in the vertical direction is spaced apart upward in the vertical direction from the rotation center axis R, the end parts need not be parallel. In other words, the distance of separation between the fixing member 600 and the rotation center axis R is not necessarily constant. It is, however, preferable for the upward end part of the fixing member 600 in the vertical direction to be parallel to the rotation center axis R.

Modification Example 11

Figure 10:
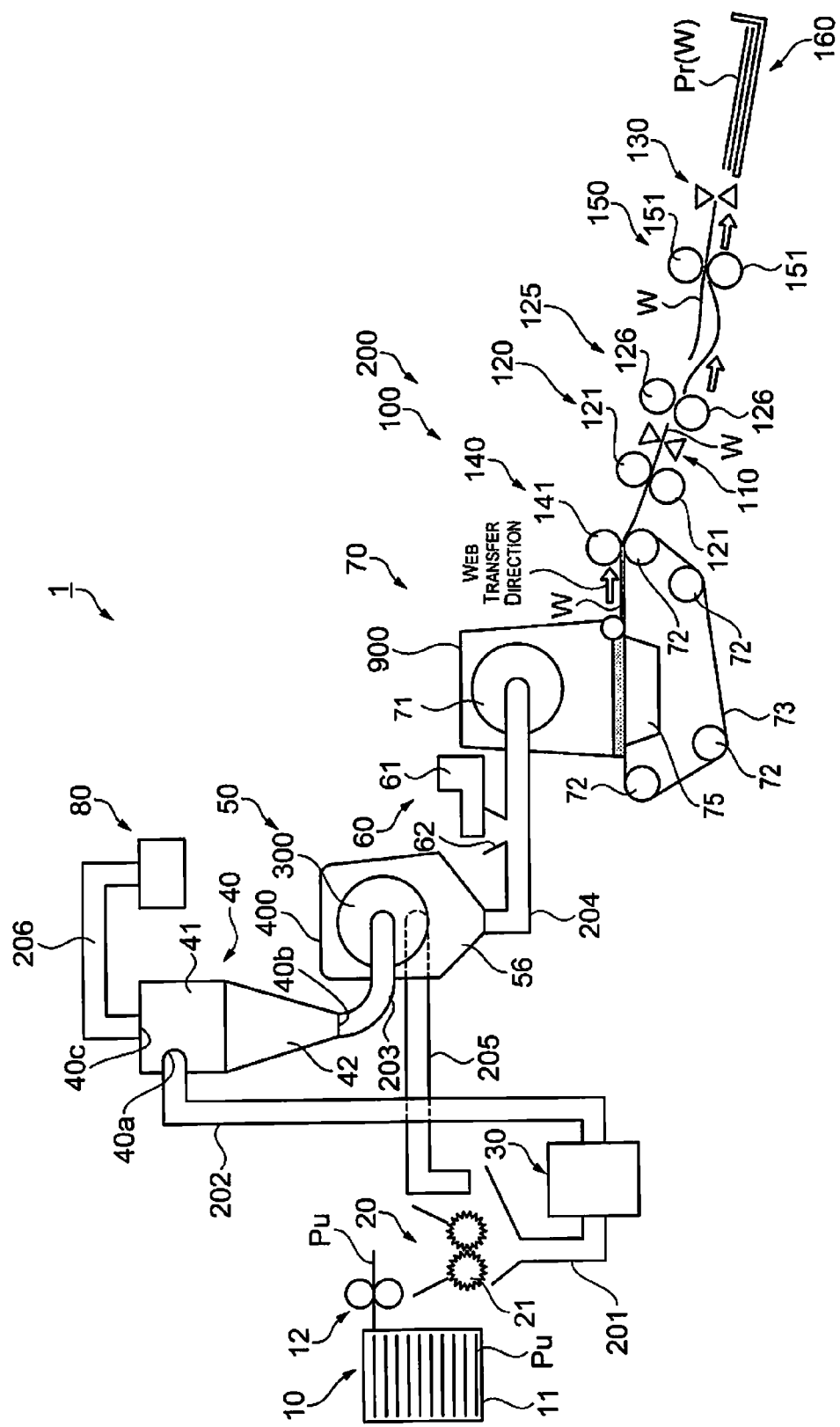
FIG. 10 is a schematic diagram illustrating the configuration of a sheet manufacturing apparatus as in a modification example.

The wall surfaces of the first housing unit 400 and the second housing unit 900 were vertical in the present embodiment, but are not limited to this configuration. For example, as illustrated in FIG. 10, the wall surfaces of the first housing unit 400 and the second housing unit 900 may be inclined surfaces. At such a time, preferably, the angle formed by the wall surfaces of the first housing unit 400 and the second housing unit 900 and the vertical plane is 5° to 20°. These wall surfaces are inclined in such a direction that downward in the vertical direction is more spaced apart from the drum unit 300 and the forming drum 71. In a cause where the wall surfaces of the first housing unit 400 and the second housing unit 900 are vertical, then in some instances some of the fibers expelled from the drum unit 300 or forming drum 71 may end up attaching to the wall surfaces of the housing units. Then, when more fibers continue attaching to the fibers that have attached to the wall surfaces, fiber masses are gradually formed. Thereafter, when the fiber masses drop down as a result of gravity, the fiber masses end up being mixed in where the fibers were deposited, and therefore problems have emerged in that the uniformity of thickness ends up being compromised when the fibers are formed into a sheet, the density ends up being changed in one portion of the sheet, or the portions where the fiber masses are end up appearing darker and compromising the texture. When there are inclined surfaces, the material that has collided with the inclined surfaces more readily drops down along the surfaces of the inclined surfaces. That is to say, the expelled material less readily attaches to the inclined surfaces. This reduces the occurrence of the fiber masses or the like and makes it possible to achieve uniformity density and thickness of the sheet. A sheet manufacturing apparatus in such a case is provided with: a drum unit that is provided with a cylindrical unit having a plurality of openings, rotation of the cylindrical unit causing a material comprising at least fibers to pass through the openings in air; a housing unit that surrounds the drum such that the cylindrical unit is positioned inwardly; and a forming unit for using the material that has passed through the openings to form a sheet; wherein the sheet manufacturing apparatus is characterized in that: the housing unit is a box shape having a plurality of surfaces; a part of the plurality of surfaces has an inclined unit that is at least inclined downward in the vertical direction from a rotation center axis of the cylindrical unit; and the inclined unit is inclined in such a direction that more downward in the vertical direction draws more away from the cylindrical unit.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A sheet manufacturing apparatus comprising:
    a dry-type defibrating unit configured to defibrate a defibration object including fibers to obtain the fibers;
    a classifier unit configured to classify a defibrated material that has been defibrated by the defibrating unit;
    a screening unit configured to allow a classified material including the fibers, that has been classified by the classifier unit to pass through a plurality of openings to screen the classified material; and
    a forming unit configured to form a sheet by using a passed material that has passed through the openings, the classified material being supplied to the screening unit by air flow coming out from the classifier unit.

2. The sheet manufacturing apparatus as set forth in claim 1, wherein
the screening unit is further configured to rotate and thereby cause the classified material to pass through the openings, and
a direction of rotation of the classified material being supplied to the screening unit by the air flow inside the classifier unit and a direction of rotation of the screening unit are the same direction.

3. The sheet manufacturing apparatus as set forth in claim 1, wherein
the classifier unit is located above the screening unit, and
the classifier unit and the screening unit are connected with a conduit that consistently goes downward.

4. The sheet manufacturing apparatus as set forth in claim 1, wherein
the classifier unit and the screening unit are directly connected without an intervening conduit.

5. The sheet manufacturing apparatus as set forth in claim 4, wherein
the classifier unit has a cylindrical or conical part, and an imaginary center line of the cylindrical or conical part is inclined with respect to a vertical direction.

6. The sheet manufacturing apparatus as set forth in claim 1, wherein
the screening unit is further configured to rotate and thereby cause the classified material to pass through the openings, and a rotation center axis of the screening unit is a horizontal direction.

7. The sheet manufacturing apparatus as set forth in claim 1, wherein
the screening unit is a rotating body that has the openings allowing passage of the classified material.

8. The sheet manufacturing apparatus as set forth in claim 1, wherein
the screening unit includes a housing, a drum that is rotatably supported by the housing and has the openings, and a fixing member that is stationarily supported by the housing and is disposed in the housing with a gap between an interior surface of the drum and the fixing member.

9. The sheet manufacturing apparatus as set forth in claim 8, wherein
the fixing member has a plain surface that is inclined to an axis of rotation of the drum.

10. The sheet manufacturing apparatus as set forth in claim 8, wherein
the fixing member is disposed upward in a vertical direction of the sheet manufacturing apparatus relative to an axis of rotation of the drum.

11. The sheet manufacturing apparatus as set forth in claim 8, wherein
the fixing member is disposed downstream in a rotational direction of the drum relative to an imaginary vertical plane that extends in a vertical direction of the sheet manugacrugin apparatus and passes through an axis of rotation of the drum.

12. A sheet manufacturing apparatus comprising:
a crushing unit including crushing blades configured to cut a stock material including fibers into a defibration object;
a defibrating unit configured to defibrate the defibration object including the fibers, which has been cut by the crushing unit, to obtain the fibers;
a classifier unit configured to classify a defibrated material that has been defibrated by the defibrating unit;
a screening unit configured to allow a classified material including the fibers, that has been classified by the classifier unit to pass through a plurality of openings to screen the classified material; and
a forming unit configured to form a sheet by using a passed material that has passed through the openings,
the classified material being supplied to the screening unit by air flow coming out from the classifier unit.

* * * * *